R. JARDINE.
GAS ENGINE VALVE.
APPLICATION FILED AUG. 8, 1921.
1,438,597.  Patented Dec. 12, 1922.
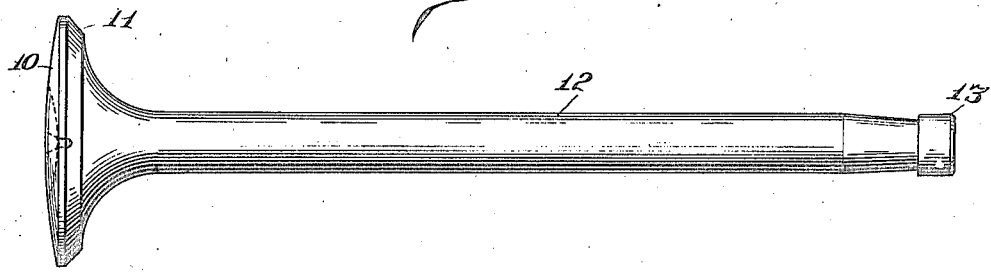
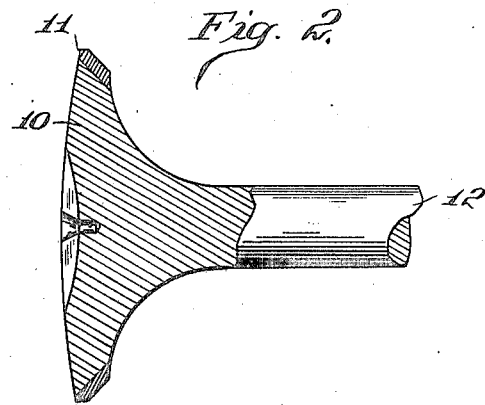
Inventor
Robert Jardine Patented Dec. 12, 1922.

1,438,597

UNITED STATES PATENT OFFICE.

ROBERT JARDINE, OF CHICAGO, ILLINOIS, ASSIGNOR TO RICH TOOL COMPANY, OF CHICAGO, ILLINOIS, A CORPORATION OF ILLINOIS.

GAS-ENGINE VALVE.

Application filed August 8, 1921. Serial No. 490,521.

*To all whom it may concern:*

Be it known that I, ROBERT JARDINE, a citizen of the United States, and resident of Chicago, county of Cook, and State of Illinois, have invented certain new and useful Improvements in Gas-Engine Valves, of which the following is a specification, and which are illustrated in the accompanying drawings, forming a part thereof.

The invention relates to valves for gas engines, its object being to overcome the difficulties experienced in valves, particularly those for the exhaust ports, heretofore employed.

One of the causes of trouble is the expansion of the head and stem, and especially the unequal expansion of the central or body portion and the rim or seating portion of the head. Since the rim or seating portion of the valve head makes contact with the relatively cool cylinder block whenever the valve is closed, the temperature attained by this part of the valve will ordinarily be substantially less than that of the central or body portion of the head and the adjacent portion of the stem, which may become red hot. The expansion of the head being greater in the central portion tends to crack the periphery or warp the entire head, and the expansion of the stem closes the clearance space between stem and tappet, and this prevents the perfect seating of the valve when the engine is hot unless the initial clearance is so great as to cause excessive noise at the tappet.

It follows that great improvement may result from the proper selection of materials having different co-efficients of expansion for the rim or seating portion and the central or body portion of the valve head, and that a highly efficient and very durable valve will be produced if, in addition, the valve stem is composed of material which does not expand at all throughout the range of temperatures likely to be attained in this part of the valve, and the material employed for the rim or seating portion of the valve head is of a character especially adapted to withstand the corroding tendency of the exhaust gases and the mechanical abrasion or wear incident to engagement with the valve seat.

The object of the invention is therefore to provide an improved valve having the characteristics indicated. To that end the invention contemplates a valve having the rim or seating portion of its head formed from one of the alloy steels which is highly resistant to corrosion and is also capable of retaining hardness at the temperatures likely to be attained in this part of the valve; while the stem and the central portion of the valve head are preferably formed integral from a metal which does not expand at all throughout the range of temperatures attained throughout the greater part of the length of the stem, and whose expansion is substantially less than other steels at the high temperatures attained in the valve head and the part of the stem immediately adjacent thereto. In some instances the end of the stem is tipped with metal having superior wearing quality.

In the accompanying drawings:

Fig. 1 is a side view of a typical valve; and

Fig. 2 is a detail view, partly in section, showing the valve head and the adjacent part of the stem.

The valve may take any desired form. For the purpose of illustration the more common form is shown, the seating portion 11 being beveled.

The central portion, 10, of the head and the stem 12 are preferably formed integral from a metal having a low coefficient of expansion. For this purpose an alloy steel is employed containing an element, such as nickel, which reduces the expansibility. If as high as 36% of nickel is used the coefficient of expansion is substantially zero up to temperatures likely to be developed in the stem except immediately under the head, and the expansion in the said central portion of the head and the part of the stem adjacent thereto will be slight.

Since the temperature attained in the rim or seating portion 11 of the valve head will not ordinarily be as great as that developed in the central portion 10 of the head, and it is desired that the expansion in the rim should be at least as great as in the remainder of the head, the said rim or seating portion 11 is desirably formed from a metal having a relatively high coefficient of expansion. Preferably the body portion 10 has its margin formed at the same inclination as that given the seating face of the valve. The rim portion 11 is, therefore, of uniform thickness. These two portions are united in any convenient manner, as by building up the rim 11 with a torch and welding rod of the desired material.

In order to secure a seating face which, while having the desired expansibility, will resist wear and will not scale or pit, the rim portion 11 may be formed of a metal which is highly resistant to corrosion and which preferably also has the quality of red hardness to some extent. The well known high nickel chrome steel may accordingly be employed, but other alloys or alloy steels may be used, as, for example, the alloy steels containing chromium and cobalt, and the alloys of chromium and cobalt without iron. When the said 36% nickel steel is employed for the stem 12, the tip 13 of the stem may advantageously be made of a harder metal.

A valve constructed as described possesses, to the degree to which the improvements set forth are carried, the following advantages:

The body portion of the head, which in practice becomes the most highly heated, is not increased as rapidly in size by expansion, and consequently has no tendency to stretch and crack the less highly heated rim or seating portion. The latter portion expands as heated, and even though the body portion is not kept down to the lowest practicable coefficient of expansion will, at its somewhat lower temperature, expand sufficiently to prevent cracking and warping. This expansion of the seating portion raises the valve on its seat, and thereby compensates for a slight elongation of the stem, such as may be caused by expansion of the highly heated part of the stem immediately under the head.

So far as now advised the most desirable metal for use in the head and at least a part of the stem, as having a low coefficient of expansion, is a steel alloy containing upwards of 25% nickel, the best results being obtained if this percentage is as high as 36. Such alloys have practically no expansibility within the range of temperatures usually developed in the stem except immediately under the head, and if this temperature is exceeded, as in the body portion of the head, the expansion of this part will not exceed that of the rim.

I claim as my invention—

1. A poppet valve for internal combustion engines comprising a relatively broad flat head and a stem with the stem extending centrally away from the head at one side of the same and having the central or body portion and the rim or seating portion of the head formed from different metals, the metal employed for the first named part of the valve head having a coefficient of expansion which is substantially less than that of the metal employed for the second named part of the head.

2. A poppet valve for internal combustion engines comprising a relatively broad flat head and a stem with the stem extending centrally away from the head at one side of the same and having the stem and the central or body portion of the head formed from metal characterized by having a low coefficient of expansion and the rim or seating portion of the head formed from a different metal having a higher coefficient of expansion.

ROBERT JARDINE.